US012712482B2

(12) United States Patent
Boell et al.

(10) Patent No.: US 12,712,482 B2
(45) Date of Patent: Aug. 18, 2026

(54) CLAMP FOR SECURING SOLAR PANEL FRAMES TO STRUCTURAL ELEMENTS

(71) Applicant: BlueScope Buildings North America, Kansas City, MO (US)

(72) Inventors: Alan Boell, Kansas City, MO (US); Richard Grabmeier, Kansas City, MO (US)

(73) Assignee: BlueScope Buildings North America, Kansas City, MO (US)

( * ) Notice: Subject to any disclaimer, the term of this patent is extended or adjusted under 35 U.S.C. 154(b) by 259 days.

(21) Appl. No.: 18/632,524

(22) Filed: Apr. 11, 2024

(65) Prior Publication Data

US 2025/0323594 A1 Oct. 16, 2025

(51) Int. Cl.
*H02S 20/22* (2014.01)
*F16B 2/02* (2006.01)

(52) U.S. Cl.
CPC ................ *H02S 20/22* (2014.12); *F16B 2/02* (2013.01)

(58) Field of Classification Search
CPC ........ F24S 25/636; F24S 25/63; F24S 25/634; F24S 25/632; F24S 25/65; F24S 25/67; F24S 25/615; H02S 20/22; F16B 2/02; F16B 2/06; F16B 7/187; F16B 5/0225
USPC ................................. 411/539; 248/500, 476
See application file for complete search history.

(56) References Cited

U.S. PATENT DOCUMENTS 3,124,330 A 3/1964 Robinson
5,076,525 A * 12/1991 Whipple ............... F24C 15/083 248/500
7,971,398 B2 7/2011 Tweedle
8,025,508 B2 9/2011 Parker
8,240,109 B2 8/2012 Cusson
8,251,326 B2 8/2012 McPheeters
8,316,590 B2 11/2012 Cusson
8,464,496 B2 6/2013 Cusson
(Continued)

FOREIGN PATENT DOCUMENTS

EP 3552307 B1 10/2019
WO 2015016987 A1 4/2014
(Continued)

OTHER PUBLICATIONS

PCT Application No. PCT/US2025/024131, International Search Report and Written Opinion, dated Jun. 24, 2025.

*Primary Examiner* — Ingrid M Weinhold
(74) *Attorney, Agent, or Firm* — Lathrop GPM LLP; Robert J. Lambrechts

(57) ABSTRACT

A clamp for adjustably securing a frame of a solar panel to a structural member of a building, the clamp including a first body member comprising a distal end and a proximal end as well as an opening in the first body member disposed proximate the distal end. The clamp also includes a second body member disposed substantially orthogonal to the first body member at the proximal end of the first body member, the second body member further comprising at least one outwardly extending restraining member for either insertion into a slot within the frame or for placement atop the frame. The clamp also includes a multi-sided head with a shaft and an off-center hole disposed within the shaft, the shaft received within the opening in the first body member and the off-center hole operable to receive a threaded fastener for insertion into the structural member.

10 Claims, 6 Drawing Sheets

(56) References Cited

U.S. PATENT DOCUMENTS 8,495,997 B1 7/2013 Laubach
8,505,863 B2 8/2013 McPheeters
8,695,290 B1 4/2014 Kim
8,733,027 B1 5/2014 Martston
8,839,573 B2 9/2014 Cusson
9,057,195 B2 6/2015 McPheeters
9,057,544 B2 6/2015 Rothschild
9,142,700 B2 9/2015 Meine
9,628,018 B2 4/2017 Stapleton
9,647,433 B2 5/2017 Meine
9,671,136 B2 6/2017 Ash
9,813,015 B1 * 11/2017 Kapla .................. F24S 25/632
9,819,303 B2 11/2017 Ash
9,865,938 B2 1/2018 Meine
9,985,577 B2 5/2018 Meine
9,998,066 B2 6/2018 West
10,079,570 B2 9/2018 Patton
10,128,790 B2 11/2018 Ash
10,218,306 B2 2/2019 Ash
10,224,870 B2 3/2019 Lester
10,240,820 B2 3/2019 Ash
10,312,855 B2 6/2019 Lester
10,337,764 B2 7/2019 Ash
10,622,935 B1 4/2020 Liu
10,686,266 B2 6/2020 Rahman
10,851,826 B2 12/2020 Ash
11,009,262 B2 5/2021 Ash
11,121,669 B2 9/2021 Stearns
11,601,087 B2 3/2023 Ash
12,003,207 B1 * 6/2024 Jasmin .................... H02S 30/10
2016/0285408 A1 9/2016 Ash
2016/0308486 A1 * 10/2016 Atia ........................ F24S 25/33
2017/0346439 A1 11/2017 Pereira
2018/0287550 A1 10/2018 McPheeters et al.
2021/0180832 A1 6/2021 Schuknecht et al.
2021/0249986 A1 8/2021 Von Deylen
2022/0149545 A1 5/2022 Ash
2022/0278516 A1 9/2022 Meine
2022/0403862 A1 12/2022 Justice
2023/0402958 A1 12/2023 Jasmin

FOREIGN PATENT DOCUMENTS

WO 2017011067 A2 1/2017
WO 2021119458 A1 12/2020
WO 2023028101 A1 3/2023

* cited by examiner

CLAMP FOR SECURING SOLAR PANEL FRAMES TO STRUCTURAL ELEMENTS

TECHNICAL FIELD

This disclosure relates generally to a system for mounting and installing photovoltaic solar panels and their associated frame, and more particularly, to a photovoltaic panel frame clamp having adjustability for controlling the downward pressure applied to the solar panel frame.

BACKGROUND

Solar panels, the heart of any solar energy system, are designed to harness the power of the sun and convert it into electricity. To ensure optimal performance and longevity, these panels must be securely held in place, typically accomplished using frames.

Solar panel frames are the structural backbone of solar arrays. They serve several critical functions that are essential for the proper operation and durability of solar panels. The primary purpose of solar panel frames is to provide support and stability to the panels. Solar panels are often exposed to various environmental factors, including wind, snow, and hail. Frames ensure that the panels remain securely in place, preventing any shifting or damage that might occur due to external forces.

Solar panels need to be positioned at the optimal tilt and angle to capture the maximum amount of sunlight throughout the day. Frames allow for adjustable mounting, enabling installers to position the panels at the ideal angle to maximize energy production based on the geographical location and seasonal variations. Frames also provide protection to the edges and corners of the solar panels. This is crucial for preventing damage to the fragile solar cells and glass surfaces from impacts, moisture, and debris. Solar panel frames are designed to enhance the overall appearance of the solar array. They give the installation a polished and finished look, making it more visually appealing.

Solar panel frames are typically made of lightweight yet robust materials that can withstand outdoor conditions and support the weight of the panels. The most common materials used for solar panel frames include: (1) aluminum which is a popular choice due to its lightweight nature, corrosion resistance, and durability. It also offers excellent thermal conductivity, which helps dissipate excess heat generated by the panels; (2) galvanized steel frames are known for their strength and durability. They are often used in larger solar installations and areas with high wind loads or extreme weather conditions; (3) composite material frames combine the advantages of different materials. Composite materials do; however, present a less efficient conductive path to ground should the frames be struck by lightning. These frames are engineered to provide an ideal balance between strength and weight.

In addition to the main frame structure, solar panel frames also include various other components to include mounting brackets that are attached to the frame and are used to secure the panels to the mounting structure, such as a rooftop or ground-based racking system. Additionally, clamps are used to hold the solar panels in place within the frame. They prevent any movement or shifting of the panels. Finally, some frames come with adjustable hinges or tilt mechanisms that allow for changes in panel angle to optimize solar exposure.

The functionality of solar panel frames is a testament to their importance. In an assembly setting solar panels are first attached to the frame using clamps or brackets. This step ensures that the panels are fixed in position. The entire assembly, including the frame and panels, is mounted onto a support structure, such as a rooftop or ground-based racking system. The mounting process involves securing the frame to the support structure. Depending on the specific design of the frame, it may allow for adjustments to the panel's tilt and angle. Installers can modify these settings to ensure that the panels receive the most sunlight possible.

Solar panel frames provide a barrier that shields the edges and corners of the panels, preventing physical damage and enhancing the longevity of the solar array. Solar panel frames are a critical component of solar energy systems. They provide essential support, stability, protection, and aesthetic appeal to solar panels while ensuring optimal positioning for maximum energy production. Whether mounted on rooftops or in ground installations, these frames play a crucial role in harnessing the power of the sun and converting it into clean, renewable electricity.

Solar panel clamps, also known as module clamps or PV (photovoltaic) clamps, serve as the connecting link between the solar panels and the mounting structure. Their primary purpose is to securely fasten the solar panels to the frame or rack, ensuring stability, longevity, and optimal energy generation. Here's a detailed breakdown of their role:

The focus of this disclosure is the clamps that secure the solar panel frames to the support structure. Solar panel frames are typically equipped with mounting holes or grooves along their frames. Solar panel clamps are specifically designed to grasp these mounting points, holding the panels securely against the frame. These clamps evenly distribute the pressure across the panel's frame, preventing localized stress points that could lead to damage or deformation. This even distribution helps protect the integrity of the solar panels. Additionally, solar panel clamps are constructed from weather-resistant materials, such as aluminum or stainless steel, to withstand exposure to the elements, including rain, snow, and UV radiation. Preferred clamps provide electrical conductivity so that the current from a lightning strike can pass into the frame, through the clamps and then into the building structural components which then move the current safely to ground.

Several types of solar panel clamps are available to suit different installation requirements and panel designs. End clamps are designed to secure the edges of the solar panels. They are positioned at the ends of the panel frame and are used in conjunction with mid clamps. The mid clamps are placed between the solar panels to secure them in the middle section of the frame. They prevent the panels from sagging or shifting due to wind or other forces. Universal clamps are versatile and can be used both at the ends and in the middle of the panels. They are adjustable to accommodate various panel sizes and thicknesses. Tin roof clamps are designed for specific roof types, such as corrugated metal roofs. They provide a secure attachment point for solar panels on these surfaces.

Installing solar panel clamps is a critical step in the solar panel installation process. Proper installation ensures the panels remain securely attached and aligned for years to come. Installers begin by positioning the solar panels on the mounting structure, ensuring they are aligned according to the desired configuration. Next, end clamps are attached to the outermost solar panels at the edges of the frame. Installers use the appropriate tools to tighten the clamps securely onto the mounting points on the panel's frame. Mid clamps are then placed between the solar panels, typically spaced evenly along the length of the array. These clamps are also secured onto the panel's mounting points. Installers may make adjustments to ensure that the panels are level, aligned correctly, and positioned at the desired angle for optimal sunlight exposure. After all the clamps are securely in place, a final inspection is performed to verify that each panel is properly attached and aligned. This step is crucial to prevent any potential issues down the line.

Solar panel clamps are an essential component in the installation of solar panel systems, playing a vital role in securing solar panels to frames or racks on various structures. Their reliable and adjustable design ensures that solar panels remain firmly in place, even in harsh weather conditions. The proper installation of these clamps is critical for the longevity and performance of a solar energy system, allowing homeowners and businesses to harness the power of the sun for clean and sustainable electricity generation.

Because solar panels come in various sizes and dimensions adjustable clamps provide the flexibility needed to accommodate different panel sizes and thicknesses, ensuring compatibility with a wide range of solar modules. This versatility streamlines the installation process and reduces the need for custom components.

Quick and easy adjustability reduces installation time and labor costs allowing installers to fine-tune panel placement without the need for complex tools or additional hardware, enhancing the overall efficiency of solar installations. Adjustable clamps also simplify maintenance tasks and future upgrades. As technology advances, older panels may need replacement or reconfiguration. Easily adjustable clamps make these processes more straightforward and cost-effective.

The solar panel industry lacks from easily adjustable frame clamps that offer versatility, efficiency, and compatibility with varying panel sizes. These types of clamps would play a crucial role in optimizing energy production, reducing installation costs, and facilitating maintenance and upgrades in the rapidly evolving solar energy sector.

SUMMARY

The disclosed clamp embodiments are utilized for adjustably securing a solar panel frame to a structural member of a building. According to a first embodiment of the disclosed clamp, the clamp includes a first body member with a distal end and a proximal end. An opening proximate the distal end is disposed in the first body member and a second body member is disposed substantially orthogonal to the first body member at the proximal end of the first body member.

The second body member further includes at least one outwardly extending restraining member for insertion into a slot or opening within the solar panel frame. Additionally, a multi-sided head with a shaft and an off-center hole disposed within the shaft is employed to receive a threaded fastener for insertion into the structural member. The shaft is received within the opening in the first body member and the off-center hole is operable to receive a fastener for insertion into the structural member. Rotation of the multi-sided head about the threaded fastener results in a translation of the clamp sufficient to restrain the frame in position against the structural member. The rotating configuration, generally referred to as a "cam" serves to translate rotary motion into linear motion.

In the first embodiment, the proximal end of the first body member merges with a center member of the second body member and the center member comprises opposed first and second sides. The thickness of the distal end of the first body member is roughly equivalent to the length of the shaft of the multi-sided head and the multi-sided head comprises at least two sides and preferably at least four sides.

In all embodiments referenced herein, the structural member may be a purlin, a cee-channel or other similar such structural component, and the threaded fastener is preferably a self-drilling fastener. The first embodiment of the clamp preferably includes a neck at the proximal end and the width of the neck portion is less than the width of the remaining portion of the first body member and the neck merges with a center member of the second body member. The center member comprises opposed first and second ends and a hold down tab extends outwardly from both the first and second opposed ends of the center member. Each hold down tab is bent slightly downward to facilitate gripping of an edge of the slot in the frame.

The center member of the second body member opposite the merger with the neck of the first body member comprises a solar panel frame spacing tab wherein the span of the solar panel spacing flange is equivalent to the preferred span of separation of adjacent solar panel frames.

A second embodiment of the disclosed solar panel frame clamp as disclosed herein includes a first body member with a distal end and a proximal end. The second embodiment includes an opening in the first body member disposed proximate the distal end and a second body member contiguous with and extending substantially orthogonal to the first body member at the proximal end of the first body member. The second body member also includes at least one outwardly extending restraining member for placement atop a frame of a solar panel.

The second embodiment includes a multi-sided head with a shaft and an off-center hole disposed within the shaft. The shaft is received within the opening in the first body member and the off-center hole is operable to receive a fastener for securing the clamp to a structural member. Rotation of the multi-sided head about the threaded fastener results in a translation of the clamp sufficient to restrain the frame in position against the structural member.

As an added benefit of this embodiment, the placement of the second body member atop the frame of the solar panel provides an electrical grounding path from the frame to the structural member. The shaft comprises a first end and a second end. The first end of the shaft comprises knurling for engagement with the structural member providing an electrically conductive path between the structural member and the solar panel frame.

With both embodiments of the disclosed solar panel a complete rotation of the multi-sided head about the threaded fastener preferably results in an adjustable translation of the outwardly extending restraining member of up to 0.25 inches. This amount of possible translation of either the hold down tabs of the first embodiment or the grounding tabs of the second embodiment will result in sufficient force being applied to the solar panel frames to secure them in position relative to the structural member.

The third, fourth and fifth embodiments of the solar panel frame clamp disclosed herein provide an alternative to the elliptical rotational mechanism set forth herein for the first two embodiments. The third, fourth and fifth embodiments rely upon the mechanics of a fastening mechanism that translates a gripping member in a linear fashion to apply the necessary force to the solar panel frame and effectively transferring the load applied thereto to a structural member of the building upon which the solar panels are mounted.

DETAILED DESCRIPTION

The following description is of various exemplary embodiments only, and is not intended to limit the scope, applicability, or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

Figure 1:
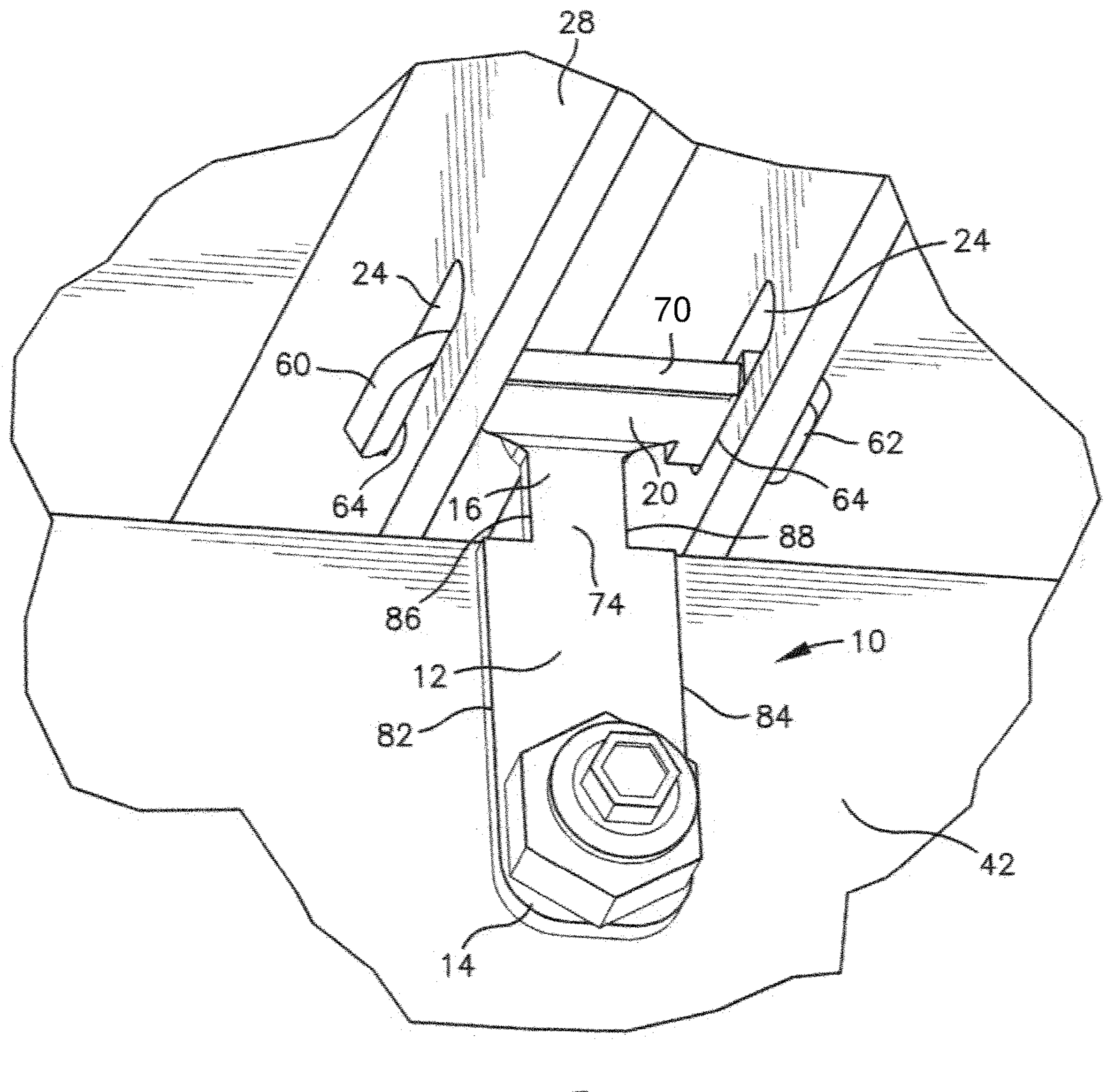
FIG. 1 illustrates a front perspective view of a first embodiment of a clamp securing a solar panel frame to a building structure.
Figure 3:
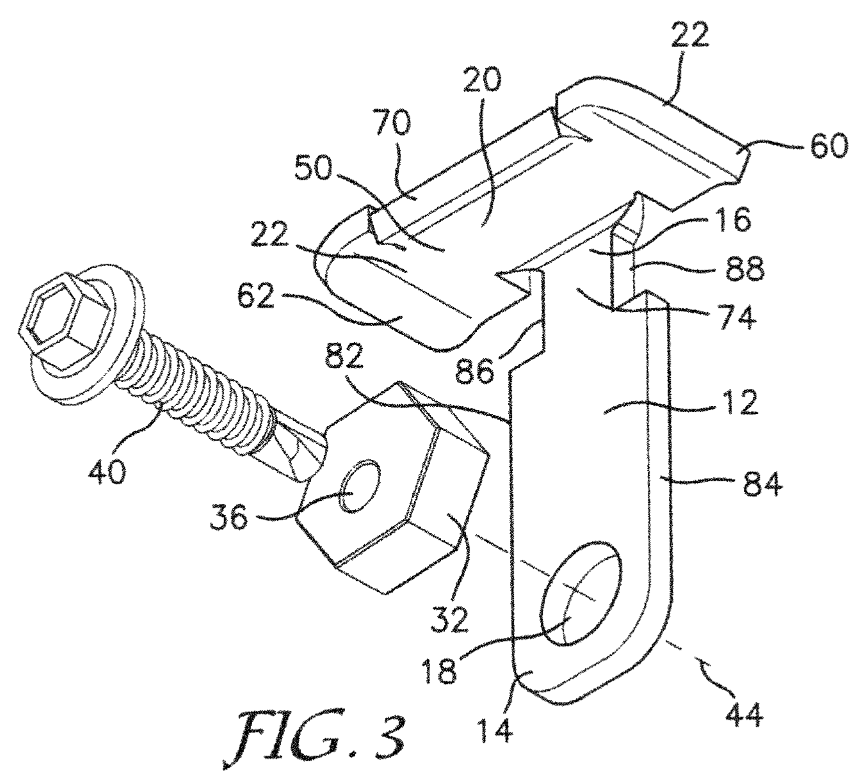
FIG. 3 illustrates a rear perspective view of the first embodiment of the clamp in isolation.

The first disclosed clamp embodiment 10, as illustrated at FIG. 1 is utilized for adjustably securing a solar panel frame to a structural member of a building. According to the first embodiment of the disclosed clamp 10, the clamp includes a first body member 12 with a distal end 14 and a proximal end 16. A through hole opening 18, as illustrated at FIG. 3, proximate the distal end 14 is disposed in the first body member 12 and a second body member 20 is disposed substantially orthogonal to the first body member 12 at the proximal end 16 of the first body member 12. The disclosed clamp 10 is preferably fabricated from corrosion and UV resistant materials such as aluminum, stainless steel engineered plastics and composites. Additionally, the dimensions of the clamps may vary depending upon the dimensions and type of solar panels and frames that are secured to the structural element.

Figure 2:
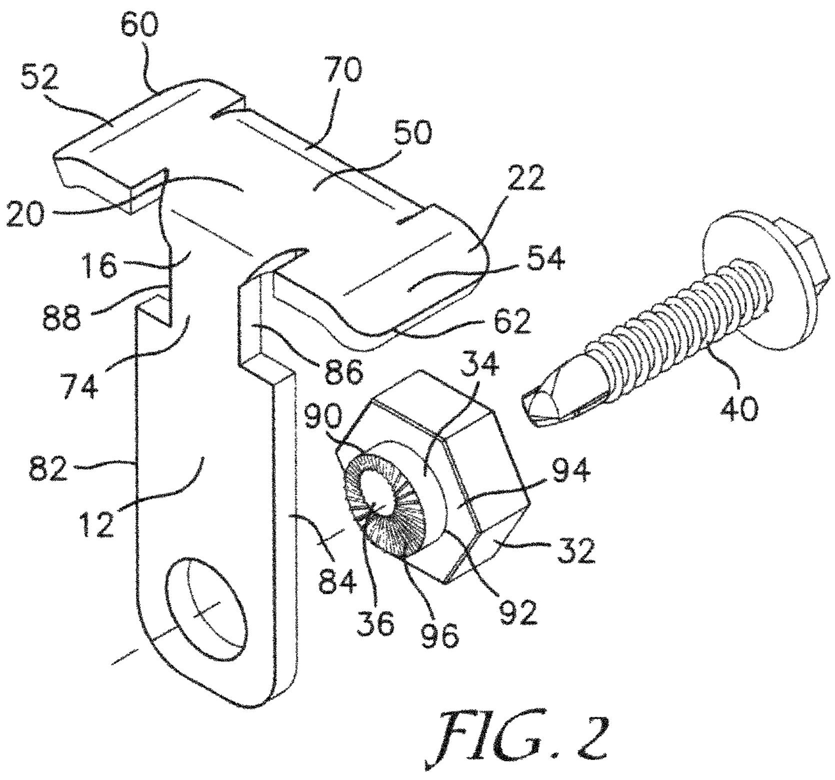
FIG. 2 illustrates a front perspective view of the first embodiment of the clamp in isolation.

As Illustrated at FIGS. 2 and 3, the second body member 20 further includes at least one outwardly extending restraining member 22 for insertion into a slot or opening 24 within the solar panel frame 28 as best illustrated at FIG. 1. Additionally, a multi-sided head 32 with a shaft 34 and an off-center through hole 36 disposed within the shaft 34 is employed to receive a fastener 40 for insertion into the structural member 42. Rotation of the multi-sided head 32 about the fastener 40, which provides an axis of rotation 44, results in a translation of the clamp 10 sufficient to restrain the frame 28 in position against the structural member 42.

Figures 4, 5:
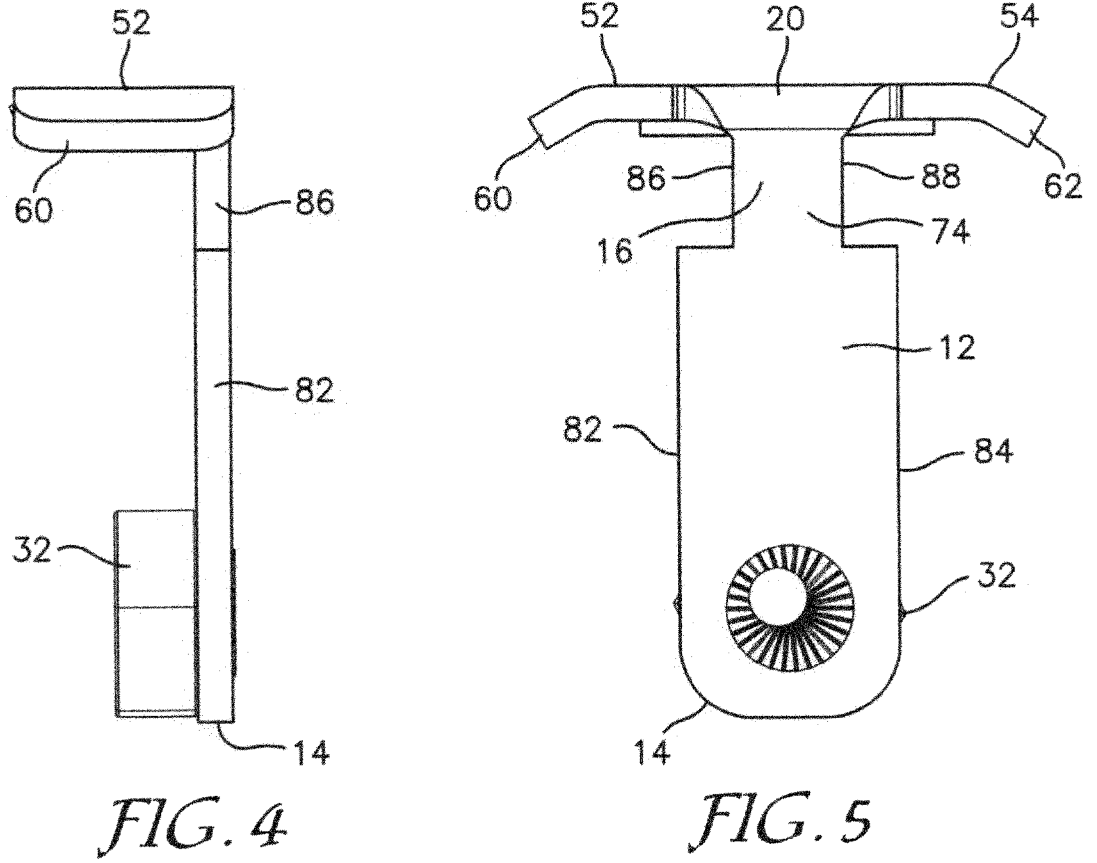
FIG. 4 illustrates a left side elevation view of the first embodiment of the clamp.
FIG. 5 illustrates a front elevation view of the first embodiment of the clamp.

In the first embodiment, the proximal end 16 of the first body member 12 merges with a center member 50 of the second body member 20 and the center member 50 comprises opposed first and second sides 52, 54. Hold down tabs 60, 62 at the outer extremes of the first and second sides 52, 54 are illustrated at FIGS. 1, 4 and 5 and are preferably canted slightly downward to facilitate gripping the edges 64 of the slot or openings 24. The downward cant angle of the hold down tabs 60, 62 is preferably in the range of about 10-25 degrees. Extending outwardly from the center member 50 is a frame module spacing tab 70. The spacing tab 70, which generally will span most of the width of the second body member 20 is depressed downwardly from the center member 50 and establishes the precise distance between adjacent solar panel frame members 28 as best illustrated at FIG. 1. The downward depression of the spacing tab 70 is preferably at an angle in the range of about 10-20 degrees.

As illustrated at FIG. 1, the clamp 10 also utilizes a neck 74 at the proximal end 16 of the first body member 12 that connects the first body member 12 to the second body member 20 at the center member 50. The neck 74 is a narrowed portion of the clamp 10 that facilitates insertion and removal of the clamp hold down tabs 60, 62 into the slots/openings 24 of the solar panel frame 28. Without the preferably equidistantly narrowed neck 74, the side edges 82, 84 of the first body member 12 would interfere with the insertion of the clamp 10. As disclosed the side edges 86, 88 of the neck 74 permits the clamp hold down tabs 60, 62 to be readily inserted into the slots 24 of the solar panel frame 28.

Referring again to FIG. 2, the shaft 34 of the multi-sided head 32 includes a first end 90 and a second end 92. The first end 90 is exposed while the second end 92 is coterminous with the inner face 94 of the multi-sided head 32 and is not exposed and therefore cannot be viewed. The first end 90 preferably has a knurled surface 96 to improve the grip of the first end 90 of the shaft as it contacts the surface of the structural member 42. The knurling 96 prevents loosening of the clamp 10 when the frame 28 of the solar panel is subjected to vibratory loading such as from powerful wind events. Additionally, the knurled surface 96 disrupts surface finishes and allows the clamp to achieve a good electrical grounding.

The knurling 96 on the first end 90 of the shaft 34 further provides greater surface contact for electrical conductivity than does a surface that does not utilize knurling. Should the solar panels or frames 28 be struck by lightening there is a need to direct the immense current load to ground as efficiently as possible. Conductive clamps 10 facilitate that pathway by allowing the current from a lightning strike to pass into the frame 28, then to the clamps 10 and finally to the building structure itself where the current passes harmlessly into the earth's surface, generally with the assistance of a grounding rod or similar such apparatus.

As previously detailed an off-center through hole 36 is disposed within the shaft 34. A fastener 40 is passed through the off-center through hole 36 and is threaded into the structural member 42. The fastener 40 serves as an axis of rotation 44 about which the multi-sided head 32 rotates. Rotation of the multi-sided head 32 about the fastener 40—axis of rotation 44—results in an elliptical movement due to the through hole 36 being off center. The eccentric rotation of the multi-sided head 32 about the axis of rotation 44 results in a translation of the clamp 10 upward and most importantly downward to restrain the slot edge 64 of the frame 28 in position. The force applied to the slot edge 64 by the cam action is counteracted by the load passing through the fastener 40 into the structural member 42. The knurling 94 of the first end 90 of the shaft 34, as previously detailed, enhances the friction forces between the structural member 42 and the knurled first end 90 of the shaft 34 preventing undesirable loosening of the clamp 10.

Figure 6:
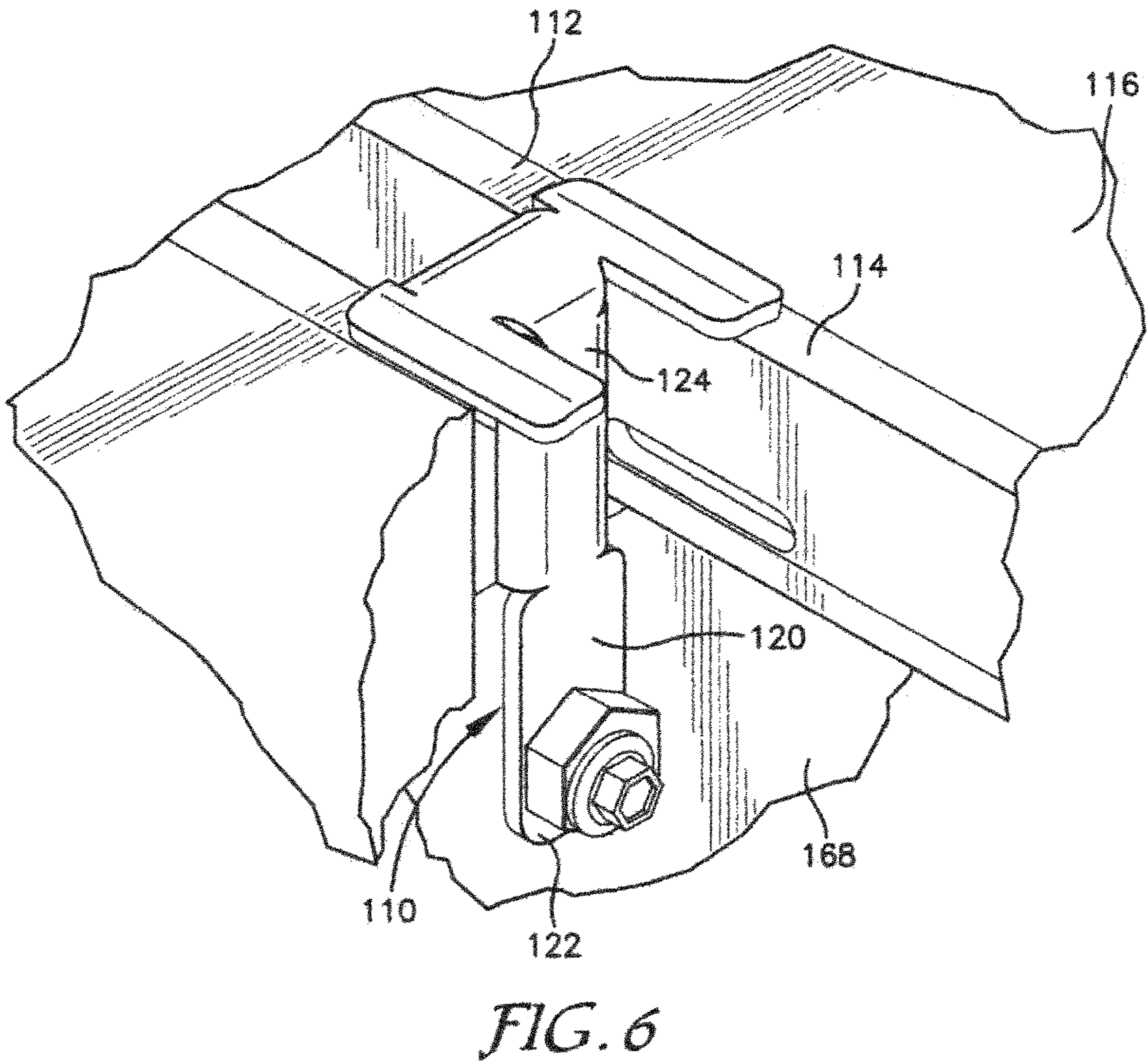
FIG. 6 illustrates a front perspective view of a second embodiment of a clamp securing a solar panel frame to a building structure.
Figures 7, 8:
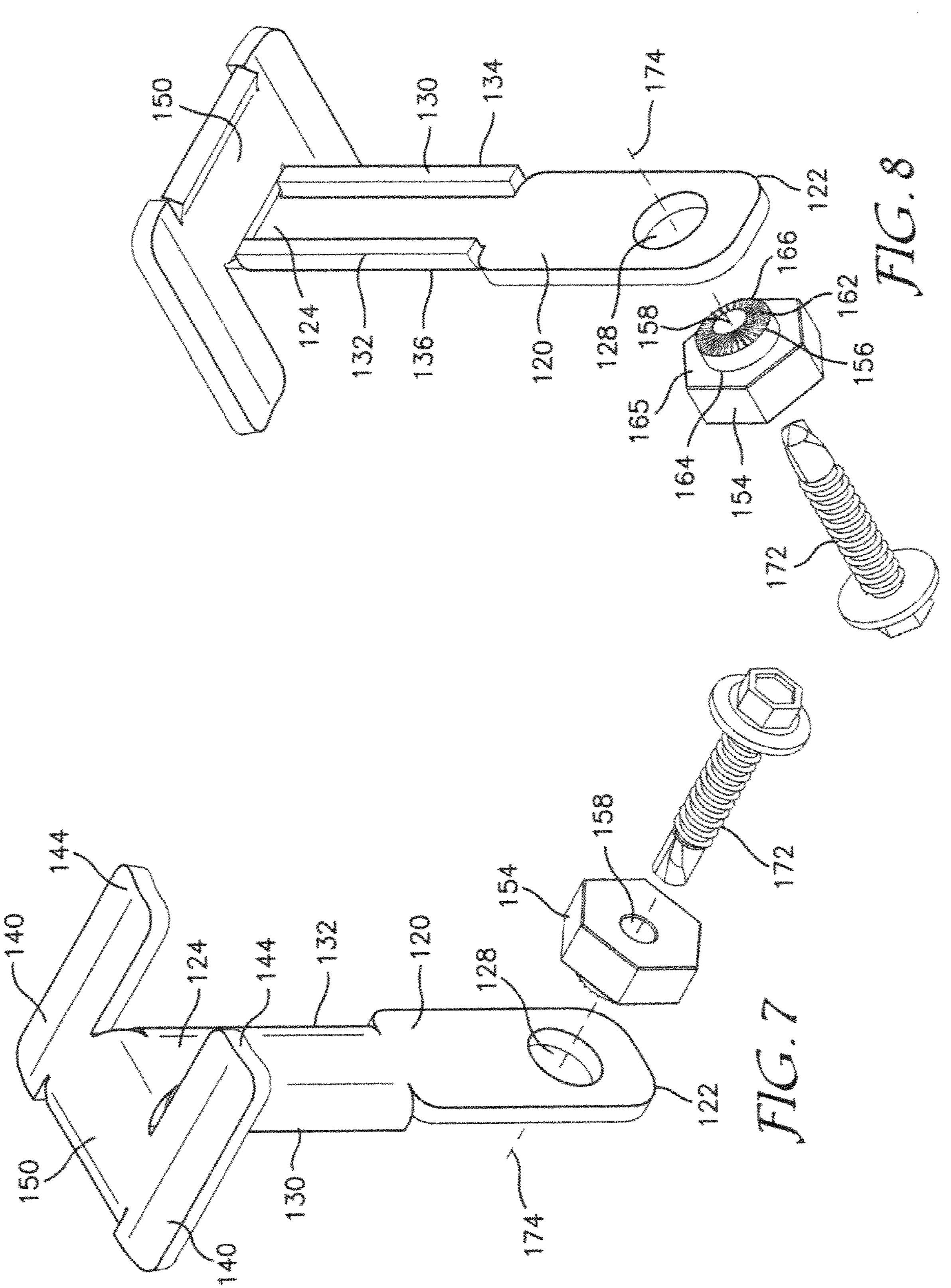
FIG. 7 illustrates a front perspective view of the second embodiment of the clamp in isolation.
FIG. 8 illustrates a rear perspective view of the second embodiment of the clamp in isolation.
Figure 9:
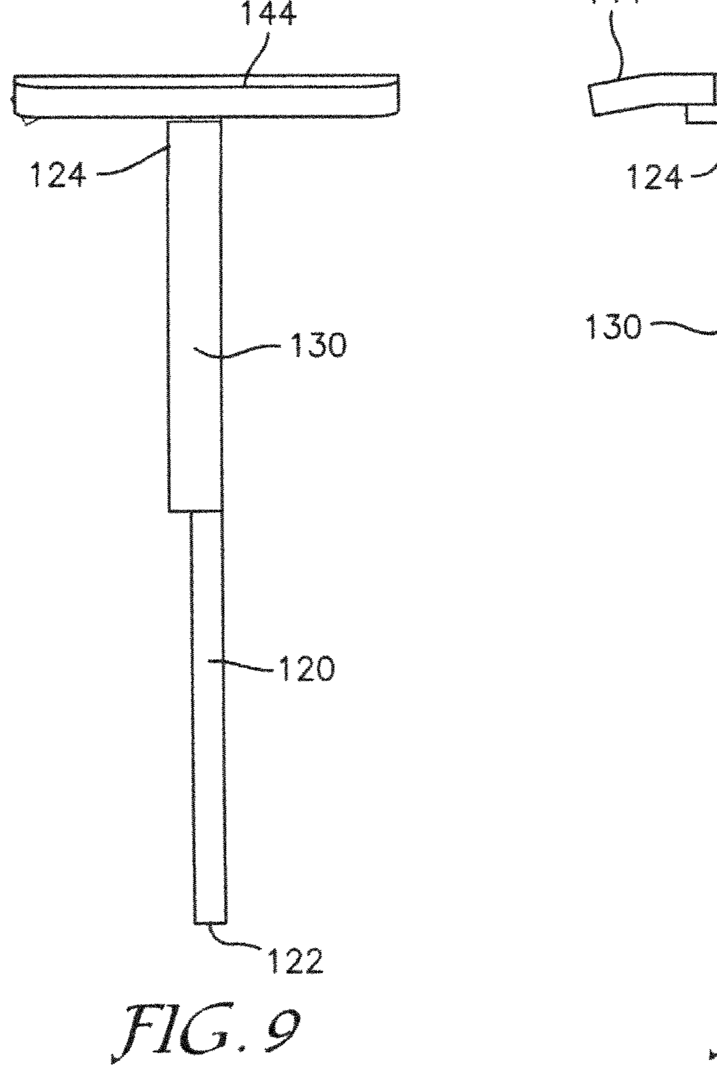
FIG. 9 illustrates a left side elevation view of the first embodiment of the clamp.
Figure 10:
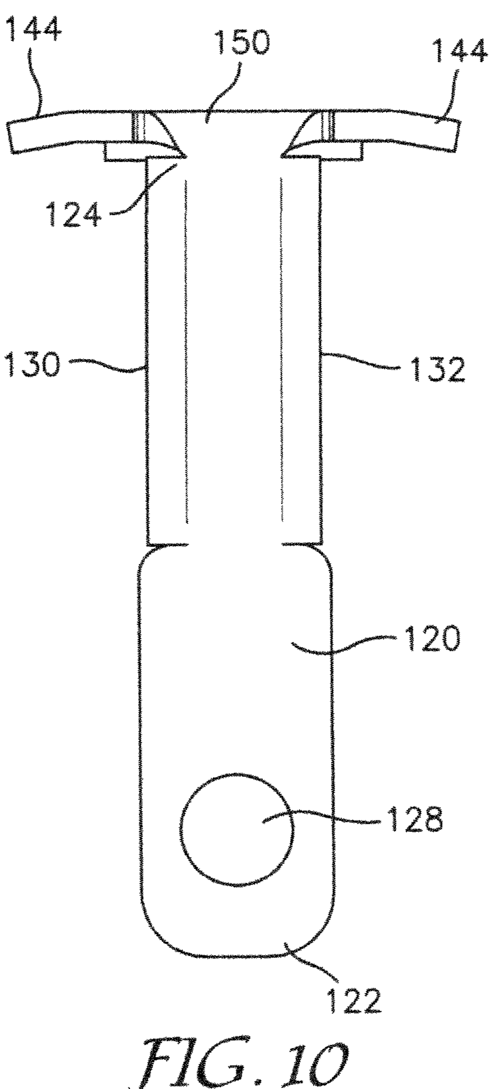
FIG. 10 illustrates a front elevation view of the first embodiment of the clamp.

A second embodiment of the disclosed clamp is illustrated at FIG. 6 and has many similar attributes of the first embodiment; however, the clamp 110 of the second embodiment is configured to pull downward on the upper surface 112 of the frame 114 surrounding the solar panel 116. The disclosed second embodiment of the clamp 110 includes a first body member 120 comprising a distal end 122 and a proximal end 124. As illustrated at FIGS. 7 and 8, the first body member 120 has a through hole 128 disposed proximate the distal end 122. In a preferred embodiment the first body member 120 has a curved reinforcing tab 130, 132 on each side 134, 136 as illustrated at FIG. 8. The reinforcing tabs preferably traverse about half of the length of the first body member 120 and serve to enhance the structural stiffness and prevent bending of the clamp 110. Reinforcing tabs 130, 132 of greater or lesser span are, however, also contemplated by this disclosure.

A second body member 140 is contiguous with and extends substantially orthogonal to the first body member 120 at the proximal end 124 of the first body member 120. The second body member 140 also includes at least one grounding tab 144. The grounding tab 144 extends outwardly as an element of the second body member 140 for placement atop the frame 114 of the solar panel 116 as best illustrated at FIG. 6. The proximal end 124 of the first body member 120 connects with a center member 150. Should more than one grounding tab 144 be employed, the center member 150 separates the opposed grounding tabs. A preferred configuration of the second clamp embodiment includes opposed grounding tabs 144 as illustrated at FIG. 7. This clamp 110 is operable for restraining a single solar panel frame or for restraining adjacent solar panel frames as single or opposed grounding tabs 144 may be employed.

As illustrated at FIGS. 7-10, the second embodiment 110 includes a multi-sided head 154 with a shaft 156 and an off-center hole 158 disposed within the shaft. The shaft 156 includes a first end 162 and a second end 164. The first end 162 extends outwardly from the back side 165 of the multisided head 154 roughly the thickness of the first body member 120. Said another way, the length of the shaft 156 of the multi-sided head 154 is roughly equivalent to the thickness of the first body member 120 and specifically at the distal end 122 of the first body member 120.

The multi-sided head 154 is preferably hexagonal in configuration, however, the head 154 may have as few as 3 sides. The first end 162 of the shaft 156 is also preferably knurled 166 for engagement with the structure 168 and to provide a robust electrically conductive pathway between the frame 114 of the solar panel and the structure 168. The shaft 156 is received within the through hole opening 128 in the first body member 120 and the off-center hole 158 is appropriately sized to receive a threaded fastener 172 for securing the clamp 110 to the structural member 168. The threaded fastener 172 is preferably a self-tapping fastener. Rotation of the multi-sided head 154 about the threaded fastener 172 on an axis of rotation 174 results in a translation of the clamp 110 sufficient to restrain the frame 114 in position against the structural member 168.

In all embodiments referenced herein, the structural member 42, 168 may be a cee-purlin or other similar such structural support member. With the first two embodiments of the solar panel frame clamp 10, 110 disclosed herein a complete rotation of the multi-sided head 32, 154 about the threaded fastener 40, 172 preferably results in an adjustable translation of the outwardly extending restraining member of up to 0.25 inches. This amount of achievable translation of either the hold down tabs of the first embodiment or the grounding tabs of the second embodiment will allow considerable fine tuning of the force necessary to properly restrain the solar panel frames in position relative to the structural member 42, 168.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings. Moreover, the order of the components detailed in the system may be modified without limiting the scope of the disclosure.

The disclosed clamp should not be construed as limiting in any way. Instead, the present disclosure is directed toward all novel and nonobvious features and aspects of the various disclosed embodiments, alone and in various combinations and sub-combinations with one another. The disclosed clamp is not limited to any specific aspect or feature or combination thereof, nor do the disclosed embodiments require that any one or more specific advantages be present, or problems be solved.

In view of the many possible embodiments to which the principles of the disclosed invention may be applied, it should be recognized that the illustrated embodiments are only examples of the disclosure and should not be taken as limiting the scope of the invention. Rather, the scope of the invention is defined by the following claims. We therefore claim as our invention all that comes within the scope of these claims.

The disclosure presented herein is believed to encompass at least one distinct invention with independent utility. While the at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention has been described above with reference to one or more preferred embodiments, it will be appreciated that various changes or modifications may be made without departing from the scope of the invention as defined in the appended claims.

We claim:

1. A clamp for securing a frame of a solar panel to a structural member, the clamp comprising:

a first body member comprising a distal end and a proximal end;

an opening in the first body member disposed proximate the distal end;

a second body member contiguous with and extending substantially orthogonal to the first body member at the proximal end of the first body member, the second body member comprising a center member and at least one outwardly extending grounding tab for placement atop the frame of the solar panel, the at least one outwardly extending grounding tab further configured to restrain the frame in position against the structural member;

a head with a shaft and an off-center hole disposed within the shaft, the shaft received within the opening in the first body member and the off-center hole operable to receive a threaded fastener for securing the clamp to the structural member, wherein rotation of the head about the threaded fastener results in a translation of the clamp to restrain the frame in position against the structural member.

2. The clamp of claim 1, wherein the proximal end of the first body member merges with the center member of the second body member.

3. The clamp of claim 2, wherein the center member comprises opposed first and second ends, and wherein the at least one outwardly extending grounding tab comprises a grounding tab extending outwardly from each of the opposed first and second ends.

4. The clamp of claim 1, wherein at least a portion of a first and second side of the first body member comprise arcuate reinforcing tabs.

5. The clamp of claim 1, wherein the thickness of the distal end of the first body member is roughly equivalent to the length of the shaft of said head.

6. The clamp of claim 1, wherein said head comprises at least three sides.

7. The clamp of claim 1, wherein the structural member is a purlin.

8. The clamp of claim 1, wherein the threaded fastener is a self-drilling fastener.

9. The clamp of claim 1, wherein the center member comprises opposed first and second ends.

10. A clamp for securing a frame of a solar panel to a structural member of a building, the clamp comprising:

a first body member comprising a distal end and a proximal end;

an opening in the first body member disposed proximate the distal end;

a second body member contiguous with and extending substantially orthogonal to the first body member at the proximal end of the first body member, the second body member comprising a center member and at least one outwardly extending grounding tab for placement atop a frame of a solar panel, wherein the placement of the second body member atop the frame of the solar panel provides an electrical grounding path from the frame to the structural member and the at least one outwardly extending grounding tab further configured to restrain the frame in position against the structural member; and a head with a shaft and an off-center hole disposed within the shaft, the shaft received within the opening in the first body member and the off-center hole operable to receive a threaded fastener for securing the clamp to the structural member, the shaft comprising a first end and a second end, the first end of the shaft comprising knurling for engagement with the structural member to provide an electrically conductive path between the structural member and the frame of the solar panel, wherein rotation of the head about the threaded fastener results in a translation of the clamp to restrain the frame in position against the structural member.

* * * * *